United States Patent [19]

Fukushima et al.

[11] 3,890,267

[45] June 17, 1975

[54] MOLDING MATERIAL

[75] Inventors: Mitio Fukushima, Suita; Teruo Iwanami, Takatsuki, both of Japan

[73] Assignee: Nippon Gohsei Kagaku Kogyo Kabushiki Kaisha, Osaka, Japan

[22] Filed: Apr. 30, 1973

[21] Appl. No.: 355,528

[52] U.S. Cl. ....... 260/42.18; 260/42.14; 260/42.15; 260/42.29; 260/42.51
[51] Int. Cl. ............................................ C08f 45/10
[58] Field of Search......... 260/41 AG, 42.14, 42.18, 260/42.15, 42.51

[56] References Cited
UNITED STATES PATENTS

| | | | |
|---|---|---|---|
| 3,355,415 | 11/1967 | Worrall | 260/41 |
| 3,578,630 | 5/1971 | Rieke et al. | 260/41 |

FOREIGN PATENTS OR APPLICATIONS

| | | |
|---|---|---|
| 1,258,900 | 2/1968 | United Kingdom |
| 634,140 | 3/1950 | United Kingdom |

OTHER PUBLICATIONS

Raff et al., Crystalline Olefin Polymers, Part II, 1964, Interscience Pub., New York, pp. 263–266.
Modern Plastics Encyclopedia, 1967, Vol. 44, No. 1A, Sept., 1966, pp. 590–591.

*Primary Examiner*—James H. Derrington
*Attorney, Agent, or Firm*—Armstrong, Nikaido & Wegner

[57] ABSTRACT

Molding material, available for engineering plastics, comprising 95 to 20 % by weight of hydrolyzed ethylene-vinyl acetate copolymer and 5 to 80 % by weight of glass fiber. An ethylene content of the copolymer is 15 to 60 % by mole and the copolymer is hydrolyzed to the extent of more than 98 % by mole in vinyl acetate component. Moreover, the compounding of a viscosity modifier and a thermoplastic urethane resin is useful.

3 Claims, No Drawings

MOLDING MATERIAL

BACKGROUND OF THE INVENTION

The present invention relates to a novel molding material, more particularly to a molding material comprising a hydrolyzed ethylene-vinyl acetate copolymer reinforced with glass fiber, being available for engineering plastics.

Molding materials for electric-device parts such as switch cover, knob or cabinet, for machine parts such as pulley, roller, bar, gear, cam or bobbin and for automobile parts are required to have properties of high impact strength, flexural strength, flexural modulus, dimensional stability against variation of temperature or humidity, because they are subjected to a large mechanical load at various atmospheres constantly or momentarily.

Engineering plastics, such as polyamide, polycarbonate or styrene-acrylonitrile copolymer, reinforced with glass fiber are known as molding materials for the abovementioned purposes. These materials have improved properties in flexural strength and flexural modulus. However, an impact strength of these materials is reduced by employing glass fiber.

Hydrolyzed ethylene-vinyl acetate copolymers have been employed in the fields of film, fiber, adhesive or coating, but have not been employed in the field of engineering plastics.

SUMMARY OF THE INVENTION

The molding material of the present invention, which comprises hydrolyzed ethylene-vinyl acetate copolymer and glass fiber, is novel in the field of the engineering plastics and useful for engineering plastics in comparison with a conventional material. The molded articles prepared from the material of the invention have excellent properties such as large impact strength as well as large flexural strength, flexural modulus, dimensional stability against variation of temperature of humidity and high deflection temperature.

OBJECT OF THE INVENTION

It is an object of the present invention to provide a novel molding material.

Further object of the invention is to provide a molding material characterized by the novel combination of a hydrolyzed ethylene-vinyl acetate copolymer with glass fiber, which is available for engineering plastics.

More further object of the invention is to provide a molded article having excellent properties for engineering plastics.

These and other objects of the invention will become apparent from the description hereinafter.

DESCRIPTION OF THE INVENTION

It has now been found that a molding material comprising glass fiber and hydrolyzed ethylene-vinyl acetate copolymer, which contains ethylene component in the range of 15 to 60 % by mole and is hydrolyzed to the extent of at least 98 % by mole in vinyl acetate component, can give an excellent molded article as engineering plastics.

To the contrary of the impact strength of conventional molded article reinforced with glass fiber being lower than that of the article prepared from resin alone, according to the present invention the impact strength of the molded article is increased by the combination of hydrolyzed ethylene-vinyl acetate copolymer and glass fiber, in addition to excellent properties such as flexural strength, flexural modulus and dimentional stability.

In practicing the invention, the hydrolyzed ethylene-vinyl acetate copolymer employed in the invention is prepared by polymerizing ethylene and vinyl acetate and then hydrolyzing the obtained copolymer by means of catalyst, for instance, sodium hydroxide. The ethylene content of the copolymer is in the range of 15 to 60 % by mole, preferably in the range of 25 to 45 % by mole. The vinyl acetate component of the ethylene-vinyl acetate copolymer is hydrolyzed in more than 98 % by mole, preferably more than 99 % by mole. In case of employing the hydrolyzed ethylene-vinyl acetate copolymer of which ethylene content is more than 60 % by mole or a degree of hydrolysis of the vinyl acetate component is lower than 98 % by mole, the deflection temperature, flexual strength and flexual modulus tend to become lower even if the copolymer is reinforced with glass fiber. In case of employing the copolymer having an ethylene content of less than 15 % by mole, the water resistance tends to become poorer and the molding tends to become difficult.

According to the present invention, in addition to the above copolymer of ethylene and vinyl acetate, there also may be effectively employed resins prepared by copolymerizing ethylene, vinyl acetate and a small amount of monomer copolymerizable therewith. Examples of the monomer copolymerizable with ethylene and vinyl acetate are propylene, alkyl acrylate such as methyl acrylate, ethyl acrylate or butyl acrylate, methyl methacrylate, acrylic acid, crotonic acid, maleic acid, and the like.

The mixture of the above-mentioned copolymer and glass fiber is molded by means of a conventional manner such as injection molding, extrusion or compression molding. The glass fiber employed in the invention may be various glass fibers commercially sold such as strand, chopped strand or milled fiber. The chopped strand is suitably employed for injection molding and extrusion. Further, the woven fabric or the mat chloth of strand, for compression molding, may be employed together with the molding material of the invention. In case of employing the chopped strand glass fiber, the molding material may be conveniently employed in a form of pellet prepared by admixing the copolymer and the chopped strand glass fiber and then melt-blending and molding by utilizing an extruder.

The amount of the glass fiber employed is in the range of 5 to 80 % by weight to the total molding material. In case of molding the material by injection molding or extrusion, the amount of the glass fiber is preferably selected from the range of 5 to 40 % by weight to the total molding material. And, in case compression molding is carried out, the amount of the glass fiber is preferably selected from the range of 20 to 80 % by weight to the total molding material.

For the purpose of improving the adhesive property of the glass fiber to the copolymer, it is effective that the surface treatment with silanes such as vinyltriethoxysilane, vinyltrichlorosilane, γ-aminopropyltriethoxysilane or β-3,4-epoxy-cyclohexylethyltrimethoxysilane, or methacrylate chromic chloride.

According to the present invention, further addition of a small amount of viscosity modifier to the molding material can improve the processability and thermal and mechanical properties of the molded articles.

The viscosity modifier is required to have the property of increasing the viscosity of the melted copolymer to the definite extent in regular intervals, and the ratio of the melt viscosity of the copolymer after standing for 10 minutes at 230°C. to that after standing for 5 minutes at 230°C. should be in the range of 1.05 to 3.0.

Examples of the viscosity modifier are acidic materials having a stronger acidity than acetic acid, such as inorganic acids, e.g. hydrochloric acid, sulfuric acid, nitric acid, phosphoric acid, phosphorous acid, hypophosphorous acid, or boric acid; organic acids, e.g. oxalic acid, citric acid, maleic acid, tartaric acid, formic acid, itaconic acid, lactic acid, adipic acid or malic acid; and hydrogen salts thereof, e.g. disodium hydrogenphosphate, sodium dihydrogenphosphate, sodium hydrogenoxalate, potassium hydrogenphosphate or potassium hydrogenformate, titanium oxysulfate; chelate compounds including titanium or aluminum; chromium chloride, zirconium acetate; organic phosphorus compounds such as phosphines, e.g. mono-, di- or tri-alkylphosphine, mono-, di- or tri-arylphosphine, mono- or di-alkylphosphonic acid, or mono- or di-arylphosphonic acid; phosphorous esters, e.g. ethyl phosphite, diphenylisodecyl phosphite, phenyldiisodecyl phosphite, trioctadecyl phosphite, triisodecyl phosphite; phosphoric esters, e.g. ethyl phosphate, and the like.

The amount of the viscosity modifier blended may be varied in accordance with its kind. In general, the viscosity modifier which is inorganic acid or organic acid is suitably employed in the ratio of 0.0001 to 0.2 % by weight to the copolymer, and the other viscosity modifiers are suitably employed in the ratio of 0.001 to 0.5 % by weight to the copolymer. Especially, phosphoric acid, phosphorous acid, hypophosphorous acid, sodium dihydrogenphosphate, disodium hydrogenphosphate and organic phosphorous compounds such as diphenylisodecyl phosphite are preferably employed.

For the purpose of improving the impact strength, thermoplastic urethane resin may be blended into hydrolyzed ethylene-vinyl acetate copolymer in an amount of 5 to 30 % by weight to the copolymer.

The molding material of the invention can be molded to the desired shape by means of usual manner such as injection molding, extrusion or compression molding. The molding temperature is generally selected from the range of from 180° to 270°C. In case the hydrolyzed ethylene-vinyl acetate copolymer abounding in ethylene component is employed, the molding temperature is preferably selected from the lower part of the above range. In case the copolymer being scant of ethylene component is employed, the molding temperature is preferably selected from the higher part of the above range.

In carrying out the molding, the molded article having smooth surface can be prepared by blending a lubricant into the molding material in an amount of 0.1 to 2 % by weight to the copolymer employed. Examples of the lubricant are metal salts of higher fatty acids such as calcium stearate, barium stearate, lead stearate, lithium stearate, zinc stearate or mercury stearate, stearic amide, ethylenebisamide, lower polymers of ethylene or propylene, and the like.

The present invention is more particularly described and explained by means of the following illustrative Examples, in which all parts are by weight and percentages are by mole except as noted.

EXAMPLE 1

To 70 parts of hydrolyzed ethylene-vinyl acetate copolymer of which ethylene content is 25 % and degree of hydrolysis is more 99.0 % was blended 30 parts of chopped strand glass fiber of alkali-free treated with vinyltriethoxysilane, of which fiber fineness is 13 deniers, fiber length is 6 mm. and filament number is 200. An extruder was charged with the above composition to prepare pellets for molding by melt-blending at 240°C. Using the obtained pellets, the injection molding was carried out at an injection temperature of 240°C. and mold temperature of 80°C. under an injection pressure of 1,200 kg.cm.$^2$ and a test sample having a thickness of 6.4 mm., width of 12.7 mm. and length of 152.4 mm. was molded.

The physical properties of the test sample were measured and the results were shown in Table 1.

The same procedure as in Example 1 was repeated except that the glass fiber was not employed. The results were shown in Table 1 as Reference Example.

Table 1

|  | Example 1 | Reference Ex. |
|---|---|---|
| Flexural strength (kg./cm.$^2$) | 1950 | 1070 |
| Flexural modulus (kg./mm.$^2$) | 1500 | 565 |
| Impact strength (Charpy test) (kg.-cm./cm. of notch) | 11.5 | 2.3 |
| Deflection temperature (°C.) | 120 | 66.1 |
| Mold shrinkage (%) | 0.23 | 1.05 |

The flexural strength and the flexural modulus were measured according to the provision of ASTM D 790, and the impact strength and the deflection temperature were measured according to the provisions of ASTM D 256 and ASTM D 648, respectively.

EXAMPLE 2

Using a mixture of 90 parts of powdery hydrolyzed ethylene-vinyl acetate copolymer of which ethylene content is 45 % and degree of hydrolysis is 99.5 % and 10 parts of chopped strand glass fiber (fiber fineness: 13 deniers, fiber length: 6 mm. and filament number: 200), and a glass woven fabric of alkali-free having a thickness of 0.8 mm., which was treated with vinyltrichlorosilane, in the ratio of 1 : 1, a conventional compression molding was carried out at a temperature of 195°C. and under a pressure of 40 kg./cm.$^2$ to give a board having a thickness of 6 mm.

The results of physical properties measured were shown in Table 2.

EXAMPLE 3

The same procedure as in Example 2 was repeated except that phosphorous acid was further employed in an amount of 0.1 % by weight to the copolymer.

The melt viscosity after standing the copolymer for 5 minutes at 230°C. was $1.1 \times 10^4$ poises and $1.4 \times 10^4$ poises after 10 minutes, and then the ratio of the melt viscosity was 1.27.

The results of physical properties measured were shown in Table 2.

TABLE 2

|  | Example 2 | Example 3 |
| --- | --- | --- |
| Flexural strength (kg./cm.$^2$) | 4050 | 4260 |
| Flexural modulus (kg./mm.$^2$) | 3200 | 3900 |
| Impact strength (Charpy test) (kg.-cm./cm. of notch) | 75 | 90 |
| Deflection temperature (°C.) | 138 | 155 |

EXAMPLE 4

To 70 parts of powdery hydrolyzed ethylenevinyl acetate copolymer (ethylene content: 45 %, degree of hydrolysis of vinyl acetate component: 99.5 %) were added 30 parts of chopped strand glass fiber (fiber fineness: 13 deniers, fiber length: 6 mm. and filament number: 200) and 0.1 part of phosphorous acid, and the injection molding was carried out by the same manner as in Example 1.

The results of physical properties measured were shown in Table 3.

Table 3

|  | Example 3 |
| --- | --- |
| Flexural strength (kg./cm.$^2$) | 3400 |
| Flexural modulus (kg./mm.$^2$) | 2600 |
| Impact strength (Charpy test) (kg.-cm./cm. of notch) | 48 |
| Deflection temperature (°C.) | 135 |

EXAMPLE 5

Orthophosphoric acid was absorbed in hydrolyzed ethylene-vinyl acetate copolymer (ethylene content: 25 %, degree of hydrolysis of vinyl acetate component: 99.0 %) in an amount of 0.15 % by weight to the copolymer. To 70 parts of the above copolymer was blended 30 parts of chopped strand glass fiber treated with vinyltrichlorosilane (fiber fineness: 13 deniers, fiber length: 6 mm. and filament number: 200). An extruder was charged with the above composition to prepare pellets for molding by melt-blending at 250°C. Using the obtained pellets, the injection molding was carried out by the same manner as in Example 1.

The results of physical properties measured were shown in Table 4.

The same procedures as in Example 5 were repeated except that 6-nylon, polycarbonate resin and acrylonitrilestyrene copolymer were respectively employed instead of hydrolyzed ethylene-vinyl acetate copolymer, as Reference Examples 1, 2 and 3.

The results of physical properties measured were shown in Table 4.

Table 4

|  | Ex. 5 | Ref. Ex. 1 | Ref. Ex. 2 | Ref. Ex. 3 |
| --- | --- | --- | --- | --- |
| Flexural strength (kg./cm.$^2$) | 2400 | 1300 | 1600 | 1650 |
| Flexural modulus (kg./mm.$^2$) | 1790 | 380 | 650 | 830 |
| Impact strength (Charpy test) (kg.-cm./cm. of notch) | 15.2 | 15.0 | 11.0 | 2.0 |
| Deflection temperature (°C.) | 130 | 175 | 145 | 105 |
| Mold shrinkage (%) | 0.21 | 0.38 | 0.30 | 0.20 |

EXAMPLES 6 to 8

The same procedures as in Example 5 were repeated except that 0.15 % of sulfuric acid as Example 6, 0.20 % of citric acid as Example 7 and 0.12 % of oxalic acid as Example 8, by weight to the copolymer, were respectively employed instead of orthophosphoric acid.

The ratio of melt viscosity of the above composition was 2.20 (Example 6), 1.20 (Example 7) and 1.10 (Example 8).

The results of physical properties measured were shown in Table 5.

Table 5

|  | Ex. 6 | Ex. 7 | Ex. 8 |
| --- | --- | --- | --- |
| Flexural strength (kg./cm.$^2$) | 2350 | 2300 | 2350 |
| Flexural modulus (kg./mm.$^2$) | 1700 | 1700 | 1750 |
| Impact strength (Charpy test) (kg.-cm./cm. of notch) | 15.0 | 14.6 | 15.1 |
| Deflection temperature (°C.) | 130 | 128 | 130 |
| Mold shrinkage (%) | 0.22 | 0.22 | 0.21 |

EXAMPLE 9 to 11

The same procedures as in Example 5 were repeated except that 0.3 % of sodium dihydrogenphosphate (Example 9), 0.6 % of disodium hydrogenphosphate (Example 10), 0.3 % of diphenylisodecyl phosphite (Example 11), to the copolymer, were respectively employed instead of orthophosphoric acid.

The ratio of melt viscosity of the above composition was 1.10 (Example 9), 1.05 (Example 10) and 1.30 (Example 11).

The results of physical properties measured were shown in Table 6.

Table 6

|  | Ex. 9 | Ex. 10 | Ex. 11 |
| --- | --- | --- | --- |
| Flexural strength (kg./cm.$^2$) | 2250 | 2200 | 2300 |
| Flexural modulus (kg./mm.$^2$) | 1600 | 1550 | 1650 |
| Impact strength (Charpy test) (kg.-cm./cm. of notch) | 14.5 | 14.0 | 15.0 |
| Deflection temperature (°C.) | 127 | 125 | 131 |
| Mold shrinkage (%) | 0.23 | 0.23 | 0.22 |

EXAMPLE 12

To 80 parts of hydrolyzed ethylene-vinyl acetate copolymer (ethylene content: 25 %, degree of hydrolysis of vinyl acetate component: 99.0 %) were blended 20 parts of PARAPRENE 22S (Thermoplastic urethane resin made by Nippon Polyurethane Industry Co., Ltd.) and 30 parts of chopped strand glass fiber of alkali-free (fiber fineness: 13 deniers, fiber length: 6 mm. and filament number: 200). An extruder was charged with the above composition, and the injection molding was carried out at a temperature of 230°C.

The results of physical properties measured were shown in Table 7.

Table 7

|  | Example 12 |
|---|---|
| Flexural strength (kg./cm.$^2$) | 1750 |
| Flexural modulus (kg./mm.$^2$) | 1250 |
| Impact strength (Charpy test) (kg.-cm./cm. of notch) | 23.5 |
| Deflection temperature (°C.) | 120 |
| Mold shrinkage (%) | 0.18 |

What we claim is:

1. A molding material consisting essentially of 95 to 20% by weight of a copolymer consisting essentially of ethylene and vinyl acetate which has been hydrolyzed and 5 to 80% by weight of glass fiber, said copolymer having ethylene content of 15 to 60% by mole and being hydrolyzed to the extent of at least 98% by mole of the vinyl acetate component of the copolymer.

2. The molding material of claim 1, in which a viscosity modifier is further blended with said molding material in an amount of 0.0001 to 0.5% by weight with said copolymer; said viscosity modifier being one capable of making the ratio of the melt viscosity of said copolymer after standing for 10 minutes at 230°C. to that after standing for 5 minutes at 230°C. fall in the range of 1.05 to 3.0, said viscosity member being selected from the group consisting of hydrochloric acid, sulfuric acid, nitric acid, phosphoric acid, phosphorous acid, hypophosphorous acid, and boric acid; oxalic acid, citric acid, maleic acid, tartaric acid, formic acid, itaconic acid, lactic acid, adipic acid and malic acid; disodium hydrogenphosphate, sodium dihydrogenphosphate, sodium hydrogenoxalate, potassium hydrogenphosphate and potassium hydrogenformate, titanium oxysulfate; chelate compounds of titanium and aluminum; chromium chloride, zirconium acetate; mono-, di- and tri-alkylphosphine, mono-, di- and tri-arylphosphine, mono- and di-alkylphosphonic acid, mono- and di-arylphosphonic acid; ethyl phosphite, diphenylisodecyl phosphite, phenyldiisodecyl phosphite, trioctadecyl phosphite, triisodecyl phosphite and ethyl phosphate.

3. The molding material of claim 2, wherein said viscosity modifier is at least one member selected from the group consisting of phosphorous acid, phosphoric acid, sodium dihydrogenphosphate, disodium hydrogenphosphate, sulfuric acid, citric acid, oxalic acid and diphenylisodecyl phosphite.

* * * * *